L. WYGODSKY.
STUFFING BOX OF CRANK SHAFT BEARINGS AND THE LIKE.
APPLICATION FILED MAY 31, 1916.
1,264,247.
Patented Apr. 30, 1918.
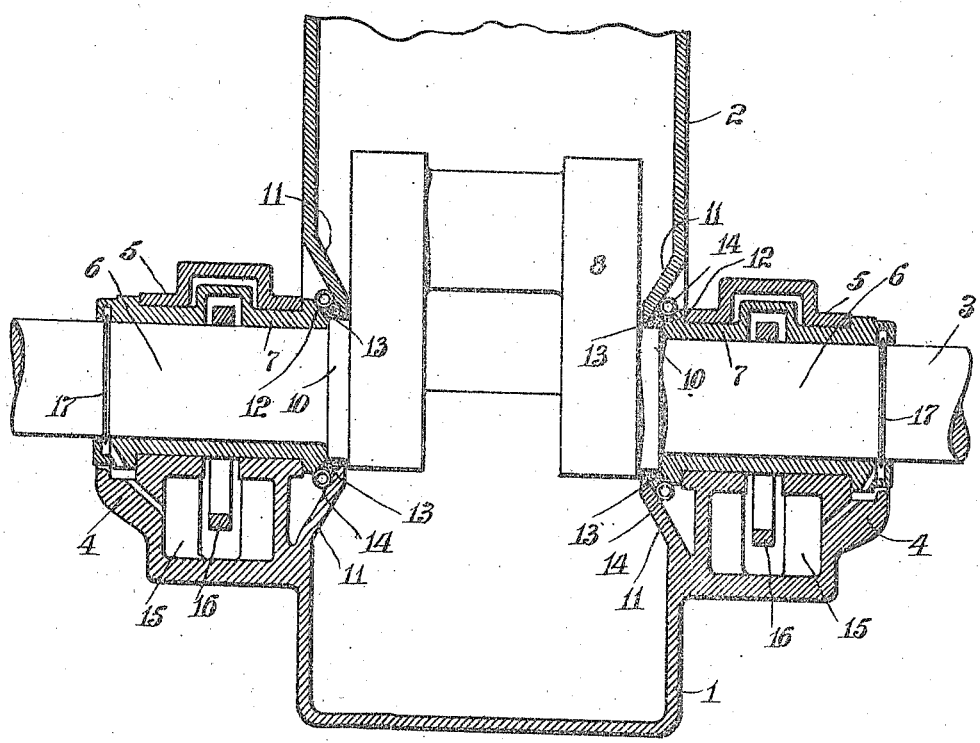
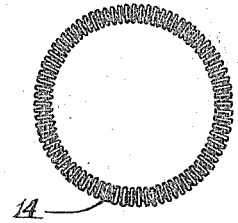

UNITED STATES PATENT OFFICE.

LEON WYGODSKY, OF BALTIMORE, MARYLAND, ASSIGNOR TO BALTIMORE OIL ENGINE COMPANY, OF BALTIMORE, MARYLAND, A CORPORATION OF DELAWARE.

STUFFING-BOX OF CRANK-SHAFT BEARINGS AND THE LIKE.

1,264,247.　　　　　　Specification of Letters Patent.　　Patented Apr. 30, 1918.

Application filed May 31, 1916.　Serial No. 100,770.

*To all whom it may concern:*

Be it known that I, LEON WYGODSKY, a subject of the Czar of Russia, and a resident of city of Baltimore, Maryland, have invented certain new and useful Improvements in Stuffing-Boxes of Crank-Shaft Bearings and the like, of which the following is a specification.

My invention relates to improvements in the stuffing boxes of crank shaft bearings of two cycle internal combustion engines and other engines and machines wherein there is a chamber, maintained constantly or at times under pressure greater than atmospheric, and which is provided with apertures for the passage of a crank shaft or the like. One of the most familiar examples of a bearing such as that with which my improved stuffing box is to be used, is the crank shaft bearing of a two-cycle engine. In such engines, air or mixture of air and fuel oil vapor is compressed to from five to ten pounds, or thereabouts, within the engine crank case. The efficiency of operation, and the fuel economy of such engines are dependent in large measure upon keeping this crank shaft bearing tight, *i. e.*, on preventing leakage around the crank shaft. It is well known that much difficulty has been experienced in providing suitable packing for these bearings; for not only must a leak-tight joint be produced, but also the joint must be such as to permit ready removal of the crank shaft, and the packing should be set up automatically. Moreover it is desirable that the space provided for the packing may be small in order that the overall length of the engine may not be too great.

My invention comprises a novel construction of the adjacent faces of the crank case or other pressure-container and of the bearing bushing, whereby a contracting space is provided for packing material; in improved means for pressing the packing into this space; and other features all as hereinafter described and particularly pointed out in the appended claims.

The object of my invention is to improve the packing arrangements in situations such as above referred to.

I will now proceed to describe my invention with reference to the accompanying drawing and will then point out the novel features in claims. In the drawing:

Figure 1 shows a central vertical section of a portion of the crank case of a two-cycle engine and of the crank shaft bearings for such an engine, showing my improved packing arrangement.

Fig. 2 shows an elevation of the helically wound spring band employed for forcing the packing against the crank shaft.

In the drawings 1 designates the lower or removable base member of the crank case, and 2 the upper member of the crank case. 3 designates the crank shaft, 4 the bearing box therefor, and 5 the removable cap of the bearing box, and 6 designates the crank shaft journal. 7 designates the crank shaft bushing, usually formed in two parts, as is the common practice.

Between the crank arm 8 of the crank shaft, and the journal surface 6 of that crank shaft, the crank shaft is provided with a shoulder 10. In the vicinity of the bearing aperture in the crank case, that crank case has an inwardly deflected portion 11; and the end of the bearing bushing adjacent to the crank case is provided with a beveled portion 12, the taper of which is somewhat greater than the taper of the portion 11 of the crank case, so that the packing space located between these tapering portions of the crank case and bearing bushing respectively, contracts inward or toward the shoulder 10. In this contracting space packing material 13 is placed, such material being commonly wicking saturated with lard or oil, or some other suitable packing material—I do not limit myself to the use of any particular packing material, and outside of this packing material a helically wound spring band 14 is provided which band, because of its elasticity, tends to force the packing material in against the shoulder 10. By reason of the pressure thus exerted upon the packing, and by reason of the inwardly tapering section of the packing space, the packing is kept at all times tightly in contact with the shoulder 10 and tightness of the joint is insured automatically. For the same reason this packing prevents lubricating oil from working out from between the shaft journal and the bearing bushing.

I have shown the bearing box as provided with an oil well 15, and with an oil ring 16, for supplying oil to the crank shaft journal; and I have also shown the shaft as provided with an oil catching ring 17 at its outer end; but as these are familiar details of the construction I no not describe them more particularly, nor do I claim them. I mention them here, however, because they constitute means whereby the journal surface is kept flooded with oil, which oil might escape and be thrown out centrifugally except for the action of the packing material, which prevents such throwing of the oil.

In the construction herein illustrated and described the packing arrangements are of such nature that the bearings, or the crank shaft, or the upper portion of the crank case, as well as the lower portion of the crank case, may be removed very readily. This is not the case in many two cycle engines, particularly those having gland packing boxes. In my engine, however, since the lower portion 1 of the crank case is separable from the upper portion 2 of the crank case, and since the bearing boxes 4 are integral with the lower portion 1 of the crank case, it is easy, by removing the bearing caps 5, to drop the lower portion of the crank case, and, with it, the bearing boxes 4 and the lower members of the bearing bushings 7. Similarly, the upper portion of the engine may be lifted off from the lower portion 1 of the crank case.

What I claim is:

1. The combination with a pressure chamber and a shaft projecting through an aperture thereof, said chamber having an inwardly inclined surface surrounding such shaft aperture, of a bearing member surrounding such shaft outside such chamber and having an inclined surface adjacent the said inclined surface of the chamber, packing material between the inclined surfaces of said chamber and bearing member, and means for pressing the packing material inward against such shaft.

2. The combination with a pressure chamber and a shaft projecting through an aperture thereof, said chamber having an inwardly inclined surface surrounding such shaft aperture, of a bearing member surrounding such shaft outside such chamber and having an inclined surface adjacent the said inclined surface of the chamber, the said surfaces of the chamber and bearing member being inclined at different angles causing the space between them to taper toward such shaft, packing material in such tapering space, and means for pressing the packing material inward against such shaft.

3. In a two cycle engine, the combination with a crank-case compression chamber and a shaft projecting through an aperture thereof, said crank-case having its external surfaces inwardly inclined in the vicinity of such shaft aperture, of a bearing member surrounding such shaft outside such chamber and having an inclined surface adjacent the said inclined surface of the chamber, packing material between the inclined surfaces of said chamber and bearing member, and means for pressing the packing material inward against such shafts.

4. In a two cycle engine, the combination with a crank-case compression chamber and a shaft projecting through an aperture thereof, said crank-case having its external surfaces inwardly inclined in the vicinity of such shaft aperture, of a bearing member surrounding such shaft outside such chamber and having an inclined surface adjacent the said inclined surface of the chamber, the said surfaces of the chamber and bearing member being inclined at different angles causing the space between them to taper toward such shaft, packing material in such tapering space, and means for pressing the packing material inward against such shaft.

5. In a two cycle engine, the combination with a crank-case compression chamber and a shaft projecting through an aperture thereof, and having, external to such chamber, a shoulder and a journal beyond such shoulder, and of less diameter than such shoulder, said crank-case having its external surfaces inwardly inclined in the vicinity of such shaft aperture, a bearing member surrounding such journal and substantially abutting against such shoulder and having an inclined surface which, with the said inclined surface of the crank case, forms a packing-space bottomed by said shaft shoulder, packing material in such space and means for pressing the packing material inward against said shoulder.

In testimony whereof I have signed this specification in the presence of two subscribing witnesses.

LEON WYGODSKY.

Witnesses:
H. M. MARBLE,
PAUL H. FRANKE.